SUPPORTING DEVICE

Filed Feb. 18, 1959

INVENTOR.
BURNIE M. CRAIG
BY Arthur H. Swanson
ATTORNEY.

United States Patent Office 2,992,787

Patented July 18, 1961

2,992,787

SUPPORTING DEVICE

Burnie M. Craig, Pasadena, Calif., assignor to Minneapolis-Honeywell Regulator Company, Minneapolis, Minn., a corporation of Delaware Filed Feb. 18, 1959, Ser. No. 794,160

3 Claims. (Cl. 242—68.2)

The present invention relates to reel supporting devices. More specifically, the present invention relates to a reel supporting hub.

An object of the present invention is to provide an improved hub for supporting any of a number of different sized reels such as magnetic tape reels.

Another object of the present invention is to provide an improved hub for supporting such reels in a firm driving relation and which features a rapid reel-changing facility.

A further object of the present invention is to provide an improved multi-size reel supporting hub, as set forth, having a simplified operation and construction.

In accomplishing these and other objects, there has been provided, in accordance with the present invention, a reel supporting hub having a movable reel retaining ring. The retaining ring is held in a circumferential hub groove formed by an adjacent pair of a plurality of annular hub segments. The position of the hub groove and the retaining ring is determined by the position of a selected adjacent pair of hub segments. The hub segments are monuted on a spindle having a locking cap as a means for retaining the hub segments.

A better understanding of the present invention may be had from the following detailed description when read in connection with the accompanying drawings, in which.

Figure 1:
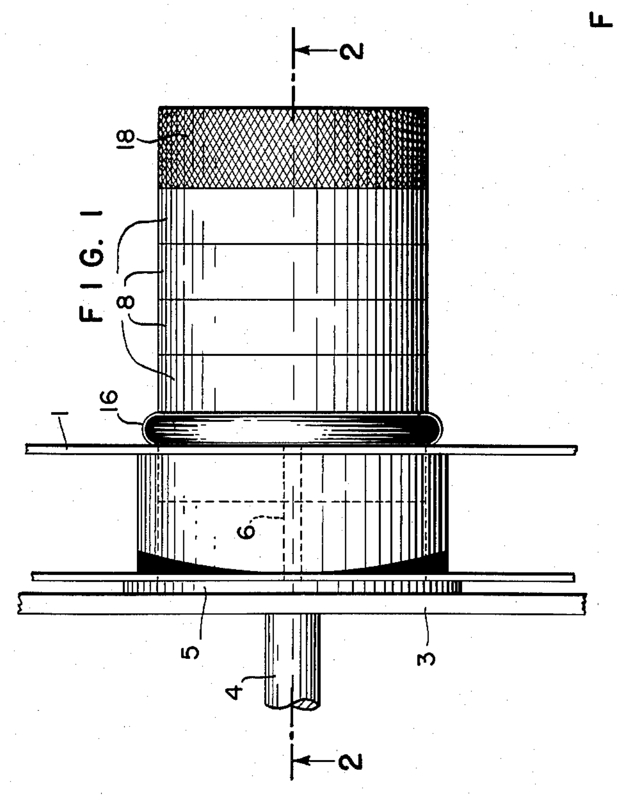
FIG. 1 is a pictorial representation of a side view of an assembled reel hub embodying the present invention.

Referring to FIG. 1, there is shown a reel hub with a reel 1 mounted thereon. The reel 1 may be a magnetic tape reel used for storing magnetic recording tape. The width of the magnetic recording tape, as commonly used, may be any one of a plurality of discrete sizes; e.g., "1" inch, "1¼" inches, etc. Consequently, the width of the tape reel also may be any one of a corresponding plurality of sizes designed to accomodate the magnetic recording tapes. The diameter of the tape reel hub opening, however, is usually standardized at a single size regardless of the width of the tape carried by the tape reel.

Figure 2:
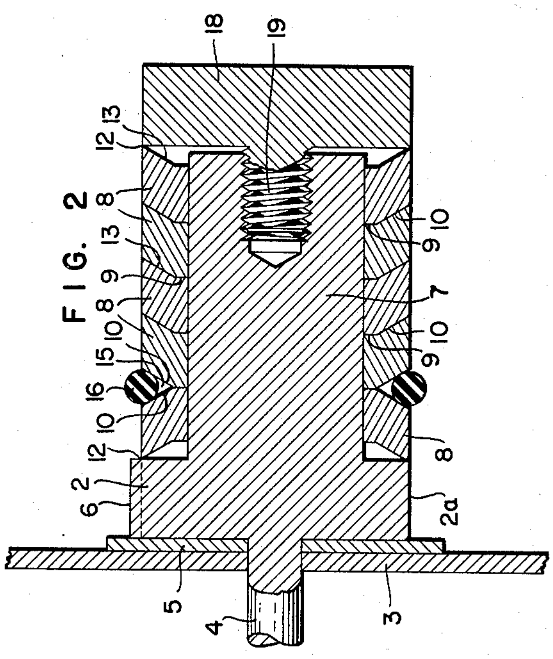
FIG. 2 is a cross-sectional represent, taken along section lines 2—2, of the reel hub shown in FIG. 1 without the tape reel.
Figure 3:
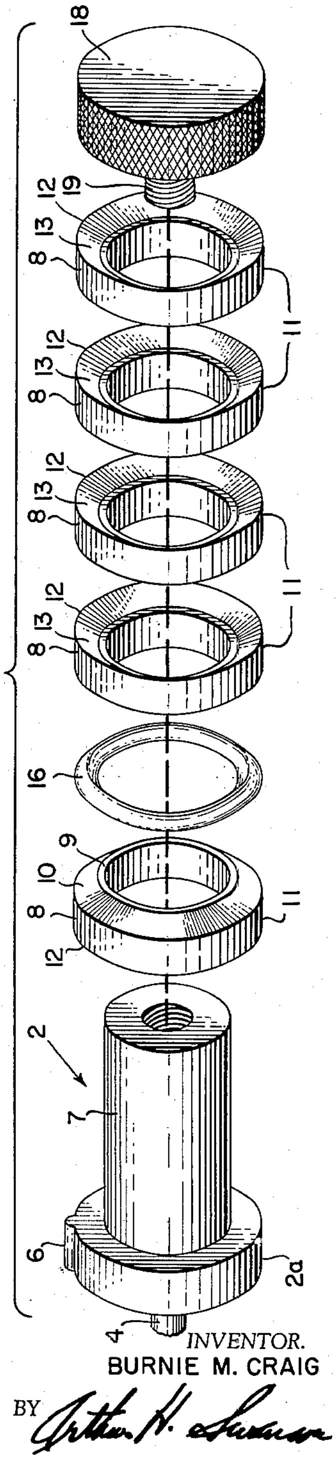
FIG. 3 is an exploded perspective representation of the reel hub shown in FIG. 1, without the tape reel.

In FIGS. 2 and 3, there are shown a cross-sectional view and an exploded perspective representation, respectively, of the reel hub shown in FIG. 1, without the magnetic tape reel 1. A spindle 2 is suitably supported in a stationary mounting plate 3. The spindle 2 is driven by any suitable driving means, not shown, connected to a spindle driving extension 4. An end plate 5 is attached to the spindle 2 to form a rotating turntable between the tape reel 1, shown in FIG. 1, and the mounting plate 3. A suitable length of the spindle 2 adjacent to the end plate is a reel driving element 2*a* having an outside diameter approximately equal to the aforesaid inside diameter of the tape reel. An integral key 6 on the reel driving element 2*a* is used to transmit the rotary motion of the spindle 2 to the tape reel and to prevent an uncontrolled rotation or slipping of the tape reel on the reel hub. A reduced diameter arbor 7, comprising the remainder of the spindle 2 is arranged to support thereon, in coaxial relation a plurality of substantially identical annular hub segments 8. Each of the hub segments 8 is arranged to have an internal diameter approximately equal to the outside of the arbor 7. The outside diameter of each of the hub sections 8 is equal to the outside diameter of the reel driving element 2*a*. Therefore, the hub sections 8 and the reel driving element 2*a* form a cylindrical hub having an outside diameter similar to the inside diameter of the tape reel.

Each of the hub segments 8 has a characterized construction composed of three contiguous elements. One element of the aforesaid construction, forming a first end 9 of the annular hub section 8, is a frustum of a cone 10. A second element is a cylindrical surface 11 forming the outer surface of the annular hub section 8 from the base of the frustum of a cone 10 to a second end 12. A third element is a frusto-conical recess 13 forming the opposite or second end 12 of the hub section 8. The recess 13 defines a concavely characterized surface which is complementary to the convexly characterized surface defined by the first end 9 and which recess 13 has a depth approximately equal to the height thereof. Thus, the recess 10 of one hub segment 8 is arranged to receive a mating element the frusto-conical first end 9 of an adjacent hub segment 8. Further, as previously mentioned, the hub segments 8 are arranged to have outside diameters equal to each other and to that of the reel driving element 2*a*. Consequently, an assembly of the hub segments 8 on the arbor 7, with the frusto-conical first ends 9 nested into adjacent frusto-conical recesses 10, forms a cylindrical surface comprised of the outer cylindrical surfaces 11 of each of the hub segments 8 and the outer surface of the reel driving element 2*a*.

A peripheral hub groove 15 may be formed between any two of the hub segments 8 by reversing one of the hub segments. The reversing of one of the hub segments is effective to bring into contact a frusto-conical first end 9 of each of two adjacent hub segments 8. It may be seen that the groove 15 does not affect the aforesaid cylindrical surface adjacent thereto formed by the cylindrical surfaces 11 of the hub segments 8. Further, it is apparent that several grooves similar to the aforesaid groove 15 may be formed by reversing several appropriate ones of the hub 8.

A resilient ring 16 is held in the groove 15 as a reel retained element. The ring 16 is arranged to have an unstretched, or static, inside diameter approximately equal to the outside diameter of the arbor 7. The ring 16, consequently, exerts a force on the adjacent hub segments 8 forming the groove 15 tending to spread the hub segments apart. The spreading of the hub segments 8 is effective to allow the ring 16 to slip between the adjacent frusto-conical first ends 9 toward the arbor 7. The ring 16 is further arranged to have an outside diameter, in a static condition, of a value slightly less than the outside diameter of the hub segments 8. Thus, when the ring 16 contracts to a static position on the arbor 7, the outer surface of the reel hub is free from the influence of the ring 16. Since, as previously discussing, the outside diameter of the reel hub is approximately equal to the inside diameter of the tape reel, the tape reel may, accordingly, be positioned with respect to the reel hub.

A locking cap 18 is used to apply pressure to the hub segments 8. The cap 18 is connected to the arbor 7 of the spindle 2 by means of a threaded cap extension 19 fitting into a tapped hole in the outer end of the arbor 7. The outside diameter of the cap 18 is no greater than the outside diameter of the hub segments 8. The application of pressure to the hub segments 8 forming the hub groove 15 is effective to apply pressure to the ring 16. The ring 16 is squeezed by the adjacent frusto-conical surfaces of the groove 15 into an expanded condition. The forced expansion of the ring 16 produces an elevation of the ring 16 above the cylindrical surface of the reel hub. As shown in FIG. 1, the expansion of the ring 16 is effective to lock the tape reel 1 against the end plate 5.

The tape reel 1 may be removed from the reel hub by loosening the cap 18 to remove the pressure on the hub segments 8. The cap 18 is loosened until the ring 16 contracts, as previously discussed, to a point below the surface of the reel hub. Since the outside diameter of the cap 18 is approximately equal to the outside diameter of the hub segments 8, the surface of the reel hub is now free of any impediment to a translatory motion of the tape reel 1 with respect to the reel hub. Thus, once the position for the hub groove and the retaining ring 16 is selected, the removal and/or the insertion of a tape reel is effected after a suitable loosening of the cap 18.

Thus, it may be seen that there has been provided, in accordance with the present invention, a reel supporting hub characterized by the ability to support and to drive multi-size reels, while featuring a rapid reel-changing facility.

What is claimed is:

1. A reel hub comprising a driving spindle having a projecting shoulder adjacent to its driving end, a plurality of dimensionally similar circular hub segments having complementary end faces, said hub segments being selectively stacked on said driving spindle to form a cylindrical hub surface, at least two of said segments being in a non-mating relationship forming a peripheral V-shaped groove therebetween, the remainder of said segments being in a mating relationship, a reel retaining resilient ring positioned in said groove, and a locking cap to retain said segments on said driving spindle and to apply an expansive reel engaging force to said retaining ring.

2. A reel hub as set forth in claim 1 wherein one of the complementary end faces of each of said hub segments is a concavely characterized surface and the other of the complementary end faces is a convexly characterized surface.

3. A reel hub as set forth in claim 2 wherein said resilient ring has an unstretched outside diameter substantially equal to the outside diameter of said hub segments and an unstretched inside diameter substantially equal to the inside diameter of said driving spindle.

References Cited in the file of this patent

UNITED STATES PATENTS

| | | |
|---|---|---|
| 2,042,171 | Durand et al. | May 26, 1936 |
| 2,696,950 | Ranger | Dec. 14, 1954 |
| 2,706,655 | Showalter | Apr. 19, 1955 |
| 2,830,821 | Bystrom | Apr. 15, 1958 |

FOREIGN PATENTS

| | | |
|---|---|---|
| 12,936 | Great Britain | of 1894 |
| 610,079 | Great Britain | Oct. 11, 1948 |